United States Patent [19]

Chertok

[11] Patent Number: 4,503,840

[45] Date of Patent: Mar. 12, 1985

[54] SOLAR ENERGY AND VENTING SYSTEMS

[75] Inventor: Burton Z. Chertok, Huntington Bay, N.Y.

[73] Assignee: Burton Energy and Solar Technology Inc., North Babylon, N.Y.

[21] Appl. No.: 447,612

[22] Filed: Dec. 7, 1982

Related U.S. Application Data

[63] Continuation-in-part of Ser. No. 288,299, Jul. 30, 1981, and Ser. No. 366,861, Apr. 9, 1982.

[51] Int. Cl.$^3$ .................................................. F24J 3/02
[52] U.S. Cl. ...................................... 126/444; 126/426; 126/445; 165/84
[58] Field of Search ....................... 126/426, 444, 445; 165/84

[56] References Cited

U.S. PATENT DOCUMENTS

| | | | |
|---|---|---|---|
| 3,789,617 | 2/1974 | Rannow | 62/115 |
| 3,991,742 | 11/1976 | Gerber | 126/426 |
| 4,036,209 | 7/1977 | Press | 126/426 X |
| 4,217,885 | 8/1980 | Bowles | 126/444 |
| 4,256,087 | 3/1981 | Sowers | 126/415 |
| 4,312,323 | 1/1982 | Domenech | 126/415 |
| 4,355,064 | 10/1982 | Imhof | 428/178 |

FOREIGN PATENT DOCUMENTS

12028 6/1980 European Pat. Off. ............ 126/444

*Primary Examiner*—Samuel Scott
*Assistant Examiner*—Allen J. Flanigan
*Attorney, Agent, or Firm*—Posnack, Roberts, Cohen & Spiecens

[57] ABSTRACT

A solar system with a thin film absorber envelope, so constructed and arranged as to have a peristaltic type action in the direction of flow of fluid passing therethrough whereby to cause bubbles in the fluid to be flushed out of the envelope. The absorber envelope is of relatively thin flexible plastic film with a support arrangement being provided for supporting the envelope at spaced positions such that the envelope is loose and ruffled between the positions. A transverse tension is applied to the envelope at these positions. The envelope is divided into parallel longitudinally disposed channels extending between an input section and output section. The input section includes a manifold coupled to and distributing the fluid to the channels. A venting arrangement is provided in an associated glazing to prevent the temperature between the glazing and envelope from exceeding a value at which the absorber envelope might be damaged.

22 Claims, 13 Drawing Figures

SOLAR ENERGY AND VENTING SYSTEMS

OTHER APPLICATIONS

This application is a continuation-in-part of my earlier filed and co-pending applications Ser. No. 288,299 filed July 30, 1981, and Ser. No. 366,861 filed Apr. 9, 1982. The contents of these applications are embodied herein as though fully set forth.

FIELD OF INVENTION

This invention relates to solar systems and to solar energy absorber envelope constructions adapted for optimizing the utilization of solar energy. The invention also relates to manifold constructions and supports for absorber envelopes and to venting arrangements for solar absorbers and for other purposes.

BACKGROUND

Solar energy constitutes a substantially inexhaustible replacement for fossil fuels which are limited in supply and relatively expensive to acquire. Many efforts have been made to develop solar energy devices and techniques and some of these are shown in various U.S. Patents, as well as in commercial developments and projects. Some of the U.S. Patents which relate to the subject of solar energy include U.S. Pat. Nos. 3,022,781; 3,991,742; 4,038,976; 4,059,094; 4,143,644; 4,146,012; 4,150,659 and Re 30,136.

S. Andrassy in U.S. Pat. No. 3,022,781 shows a solar fluid heating unit having two flexible film members secured to each other adjacent their peripheries and further secured to each other in preselected regions interiorly of the periphery to provide a fluid passageway between the two flexible film members. It is stated that the fluid passage may be serpentine or in the form of a pair of headers with a plurality of fluid conduits interconnecting the headers.

D. Gerber in U.S. Pat. No. 3,991,742 shows a heat transfer system utilizing solar energy and especially suitable for heating large quantities of water by small temperature increments by circulating the water in repeated cycles in a thin layer between two flexible sheets of a dark flexible panel. A pump supplies a continous quantity of water to be warmed to the upper edge of the panel and a distributor pipe evenly distributes the water along the top edge of the panel, wherefrom it flows over the member for spreading the water evenly over the entire surface area of the inside of the panel. A collector pipe collects the water at the bottom edge of the panel and a return system recirculates the warmed water to a pool therefor.

H. Stout et al. show in U.S. Pat. No. 4,038,967 a light-weight low-cost solar heating collecting system for use with homes and other such structures. A liquid black body medium is pumped to an elevated end of each unit and drains down through each panel by gravity feed back to a storage tank where the heated liquid is circulated on demand through the associated building. Each heating panel is comprised of a rigid foam plastic frame having a back wall on which is disposed a reflective stratum. A sheet of plastic material having a black surface is bonded to the reflective stratum along spaced parallel lines to define a plurality of parallel channels extending lengthwise of the panel. Manifolds are provided at opposite ends of the panel to feed the liquid into and drain the liquid from the channels.

C. Barrio de Mendoza shows in U.S. Pat. No. 4,059,094 a solar collector energy apparatus wherein is employed a parabolic reflective surface or mirror for receiving solar radiation and focusing the same onto a pipe disposed at the focal point of the reflecting arrangement. The pipe is also in direct contact with the parabolic mirror collector so as to receive reflection from the mirror. A heat chamber is included behind the parabolic mirror collector to trap heat behind the collector and provide an additional heat source for the pipe and for fluid therein.

H. Heitland et al. show a solar heating apparatus with a tubular conduit structure having an inlet and outlet for a flowable heat carrying medium and being formed of two elongated flexible foils, one being adapted to absorb solar radiation, the foils being sealingly connected along lines in their center regions to form a plurality of parallel flow channels which extend along the longitudinal axis of the foils. Transfer flow channels are provided which connect the respective ends of the parallel flow channels together.

W. Elkins et al. in U.S. Pat. No. 4,146,012 disclose a solar heat exchange panel manufactured by a high-speed rotogravure or heat sealing process wherein two elongated sheets of flexible plastic film are laminated together along lines defining inlet and outlet mainfolds and a plurality of flow passages. The manifolds extend substantially along the entire length of the sheets and the flow passageways are arranged in groups to form individual heat exchange sections which are served by the manifold. Mounting loops are provided along the lateral edges of the panel and are adapted for receiving elongated rods by which the panel can be coupled or secured to another such panel.

Bruce Buckley discloses in U.S. Pat. No. 4,150,659 an arrangement for venting the glazing or transparent cover of a solar collector in order to prevent the collector's absorber surface from reaching too high a temperature. The arrangement involves a damper at one end of the apparatus which is movable between positions which selectively permit communication between the air space in the associated solar energy collecting apparatus and ambient atmosphere and a particular arrangement is provided for undergoing thermally produced dimensional change in response to changing temperature conditions in the apparatus to move the damper between positions to allow air flow through the apparatus when the temperature exceeds a certain limit.

A. Schriefer shows in U.S. Pat. No. Re. 30,136 a solar collector for use in receiving solar raiation and converting the same to heat and including a matrix of plural layers of slit-and-expanded sheets contained within the solar collector with the heat produced by the matrix being transferred by convection into a force fluid flow. The surfaces of the slit-and-expanded sheets are coated to absorb and convert the radiant energy to heat and a reflective surface is provided behind the matrix to reflect solar energy back into the matrix.

I am furthermore aware of projects at Brookhaven National Library (BNL) in Upton, L.I., N.Y., funded by the Department of Energy and Environment, with the purpose of attempting to cut drammatically the cost of so-called flat plate solar collectors. These projects are believed to cover the details necessary to the actual construction of a production version of a thin-film collector that would be acceptable for mass installation.

The final working models of these projects, which were submitted for independent testing, certification and public exhibit, consisted of an absorber plate constructed of a laminate material consisting of 0.002 aluminum and 0.001 Teflon (FEP). The aluminum was bonded to the Teflon with an adhesive. The two layers were bonded with strips of pressure sensitive adhesive, placed in a manner which caused the perimeter to be sealed (and water-tight) and the intervening area to be divided into lanes which were deemed requisite to the "wetting" of the film. Holes were placed in one of the laminate skins communicating with each of the water lanes whereupon a pipe, drilled with identically spaced holes was put in place with adhesive in a manner which caused its holes to be aligned with the holes in the laminate skin thereby creating a manifold entry for fluid to pass into or out of the absorber. This process occurred at both ends of the laminated absorber "bag" so as to provide an inlet and exhaust for a circulating fluid. The aluminum foil was then coated with material of a nature which enabled it to absorb more of the sun's rays than it re-radiated (otherwise known as a "selective" surface). Various paints could function well from an adhesion standpoint but the selective surface was chosen for its superior thermal performance despite the fact that it was supplied in sheet form which had to be bonded to the laminate by an adhesive medium. The reasoning behind the usage of aluminum foil was based upon the fact that entrapped air bubbles were inevitable in a gravity fed vessel constructed of opposed film structures. These bubbles will, if allowed to remain, hamper the overall effectiveness of an absorber due to the lack of utilization of the surface that is located over any such areas.

SUMMARY OF THE INVENTION

One object of the invention is to provide an improved solar energy system and technique and particularly to provide improvements with respect to known types of solar energy absorbers and panels and relating to the collection and utilization of solar energy.

It is another object of the invention to provide for the production of improved solar apparatus and techniques such as to improve the efficiency of operation thereof by avoiding the consequences of air which may be entrapped in the solar energy collecting fluid which is employed.

Still another object of the invention is to provide improved solar collectors and techniques involving the use of improved manifolds adapted for distributing fluid into solar absorber plates.

Yet another object of the invention is to provide improved arrangements for supporting flexible solar absorber plates or envelopes whereby to enable the effecting of a peristaltic type of action and whereby to maintain such envelopes under appropriate tension when in operation.

Another object of the invention is to provide for the incorporation of controlled vents into solar energy collecting apparatus in order to prevent involved temperatures from rising to destructive limits.

In achieving the above and other objects of the invention, there is provided a solar system comprising input means for the supply of a fluid adapted for the absorbing of solar energy, output means for receiving and recirculating said fluid for purposes of heat exchange, and solar energy absorber means coupling the input means to the output means for the conveying of the fluid between the same. The absorber means includes a thin-film flexible envelope and support means to immobilize the envelope at spaced positions between which corresponding lengths of the envelope are longer than the distances between the positions so as to enable the envelope to have a peristaltic type flutter action in the direction of flow of the fluid from the input means to the output means whereby to aid in causing bubbles formed in the fluid to be flushed out of the absorber means thereby to improve the thermal efficiency of the same.

In further accordance with the invention, the aforesaid support means includes a relatively rigid member having a longitudinal extent corresponding generally to the direction of the flow of the fluid through the envelope and the above-mentioned positions are spaced along the longitudinal extent of the rigid member. The envelope is fixed to the rigid member at the above-mentioned positions and the fixing of the envelope to the rigid member forms ruffles in the envelope.

According to one specific aspect of the invention, the envelope is fixed peripherally to the rigid member and, as will be seen, the rigid member includes a flexible case and a rigid interior member within the case to support the same. Preferably the envelope and case are of plastic and are welded or otherwise bonded together at the aforementioned positions. Preferably the positions are substantially equally spaced.

In further accordance with the invention, means are provided coupling the output means to the input means in an endless circuit which is open to ambient atmosphere. In accordance with another feature of the invention, the absorber is arranged at an incline so that the fluid passes through the envelope from the input means to the output means under the influence of gravity. In accordance with yet another aspect of the invention, means are provided for applying transverse tension to the envelope at at least some of the aforementioned positions.

As will be shown in greater detail hereinafter, the envelope is provided with seams which divide the envelope into parallel channels extending between the input and output means. Furthermore, the envelope is of a thin-film preferably having a thickness in the order of magnitude of about 0.005 inches.

According to yet another feature of the invention, there is provided a glazing means supported over the envelope and forming a chamber with the same. The glazing means is provided with at least one vent and the solar system of the invention includes closing means to obturate this vent selectively to control temperature within the chamber. The closing means of the invention includes preferably a flap operatively disposed for selectively closing the vent, and there are provided control means coupled to the flap to displace the same. The control means may preferably include, in accordance with the invention, a tube coupled to the input means and through which the water flows to the input means, said tube when filled with water to a predetermined degree being sufficiently heavy to operate the flap. Spring means may be provided to maintain the flap in normally open condition. There may also be provided, in accordance with the invention, a vacuum breaker operatively associated with the tube to enable a draining of the same.

In further accordance with the invention, a system is provided for applying transverse tension to the envelope at at least some of the positions. More particularly there are provided straps attached peripherally to the envelope and wrapped around the rigid member and including distal end portions with spring means being provided to couple the end portions together.

Viewed from another aspect, the invention provides further a fluid operated system comprising fluid passage means for the passage of fluid therethrough, a glazing means operatively associated with the fluid passage means and forming a chamber therewith, fluid input to feed fluid to the fluid passage means, said glazing means being provided with at least one vent for the control of air flow into the chamber, obturating means for selectively closing this vent, and control means for controlling the obturating means. The control means operates pass the fluid to the input means and is responsive to the presence of the water for controlling the obturating means.

According to one embodiment of the invention, the control means is responsive to the weight of the fluid for controlling the obturating means. According to another embodiment of the invention, the control means includes means responsive to the volume of the fluid for controlling the obturating means.

More particularly, the control means may include a tube to which the fluid passes, and which when filled with a fluid to a predetermined degree, is of adequate weight to operate the obturating means. The obturating means may be, for example, a spring loaded flap. As noted hereinabove, use may be made of a vacuum breaker operatively associated with the tube to permit gravity drainage of the same.

According to a second embodiment of the invention, the control means may include a bladder to pass and be extended by the fluid and at least one link between the bladder and obturating means to operate the latter in response to the bladder. The control means may moreover include a pivotal member operated by the bladder and controlling movement of the link.

According to yet another embodiment, the control means may include an actuator which responds to a head of water created thereabove to operate a spring loaded flap. The actuator may in this case be a proton and cylinder arrangement and, in this as well as in other embodiments, the term "flap" shall be understood to mean a pivotal flap or sliding shutter or other equivalents thereof.

In accordance with another aspect of the invention, there is provided a solar system comprising a thin-film absorber envelope and support means to support the envelope in inclined posture for the gravity flow of fluid therethrough, and to fix the envelope in ruffled condition at spaced positions, the distances between which are less than the lengths of the corresponding portions of the envelope. Preferably the positions are substantially equally spaced and the support means may include a plastic case and a stiffening member within the case, said envelope being of plastic welded at said positions to the plastic case.

In accordance with another aspect of the invention, there is provided a solar system comprising input means for the supply of a fluid adapted for the absorbing of solar energy, an output system for receiving and recirculating this fluid for purposes of heat exchange, and solar energy absorber means coupling said input means to said output system for the conveying of fluid between the same.

The absorber means is as noted hereinabove, a thin-film flexible envelope and there is provided a support supporting the envelope at spaced positions between which corresponding lengths of the envelope are longer than the distances between the position so as to form ruffles and so as to enable the envelope to have a peristaltic type of flutter action to flush bubbles from the system. The input means noted hereinabove will, in accordance with the invention, include a manifold to distribute the fluid into the envelope. The envelope, as noted above, includes seams to divide the envelope into a plurality of channels and the manifold in accordance with the invention will include fingers extending respectively into the channels. This manifold, in accordance with the invention, is preferably formed of three sheets forming two chambers separated by one of the sheets which is provided with openings through which the two chambers communicate. A second of the sheets includes the aforesaid fingers, and the fingers are provided with passages opening into the channels. The second sheet is moreover provided with a further passage coupling the first said passages. In accordance with a feature of the invention, the openings in the said one sheets are superposed over the passages opening into the channels. The third of the aforesaid sheets is a tent-like sheet, and is welded into an opening provided in the aforesaid envelope.

Other objects, features and advantages of the invention will be found in the detailed description which follows hereinafter as illustrated in the accompanying drawing.

DETAILED DESCRIPTION

One of the principal purposes of the invention, but not the exclusive reason therefor, is the elimination of bubbles which are generated in a circulating fluid employed in a solar collecting plate particularly in solar collecting plates of the type formed of flexible thin plastic films as has been mentioned hereinabove.

In accordance with the invention, it has been determined that a viable solution to the aforementioned bubbles resides in the continual elimination of the offending bubbles either at their source or from the absorber plate itself. At the outset of experimentation, various thicknesses of Mylar film were employed in the construction of simulated absorber plates. While this material is generally unsuitable for continued usage with warm water due to its hydrolytic instability, it was inexpensive, readily available and mechanically suitable for short duration modeling work. This material, when held to 0.003 inch thickness and appropriately configured tends to undulate in a manner which causes traveling waves to proceed in the direction of water flow down the associated panel. The phenomenon resembles intestinal peristalsis and this peristaltic action serves the very same function where the air bubbles are concerned, driving them along until they are flushed away.

When relatively thick film specimens are utilized, this undulation does not occur, and the ever-present bubbles remain in place. Mechanical agitation of the upper surface film can also result in an artificially induced peristaltic waves and will remove the bubble problem. It has now been determined that configuring and supporting solar energy absorber envelopes in the form of ruffles (i.e., relaxed portions between fixed points) will achieve the desired result of eliminating bubbles.

Figure 1:
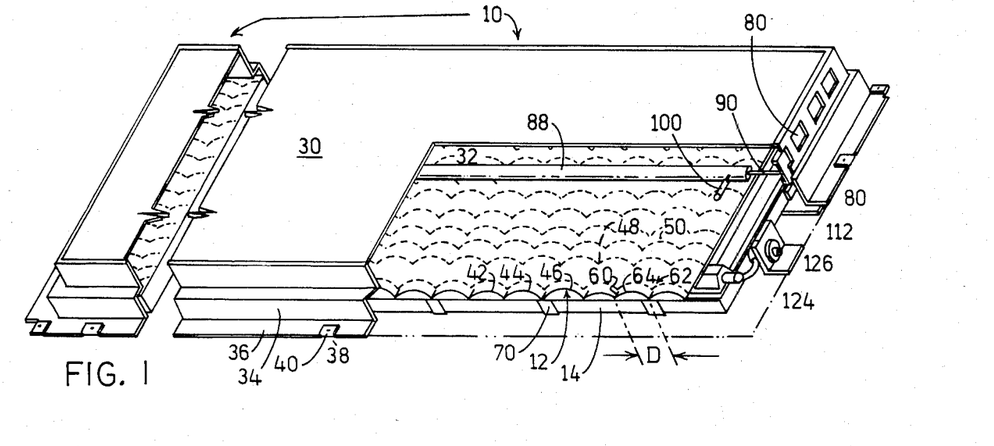
FIG. 1 is a perspective partially broken-away view of an absorber plate and envelope provided in accordance with one preferred embodiment of this invention and a portion of which is diagrammatically shown.
Figure 2:
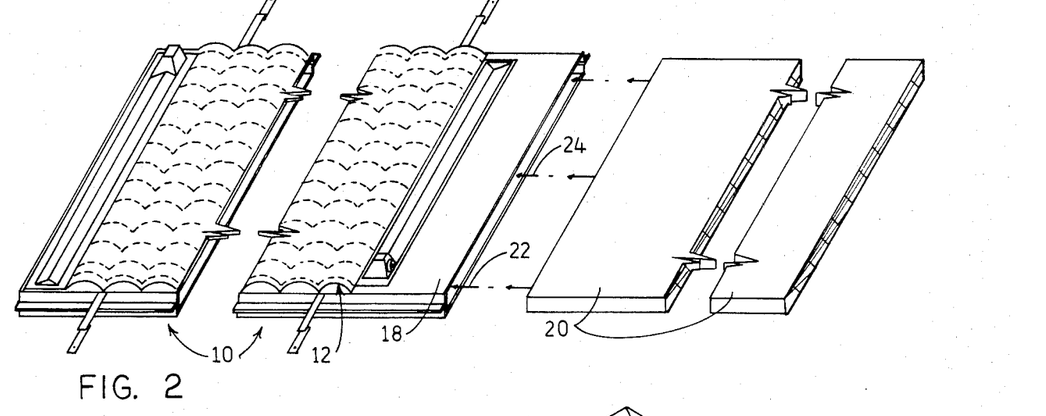
FIG. 2 is a perspective partially broken-away and exploded view of part of the structure shown in FIG. 1.

FIGS. 1 and 2 of the drawing illustrate generally a solar panel indicated at 10. This solar panel includes a solar energy absorbing envelope which is formed of a thin film and which is flexible. This envelope is indicated generally at 12 and is diagrammatically shown. A generally rigid member 14 is provided upon which the envelope 12 is supported. The rigid member 14 is generally supported in inclined position so that water or other such fluid may flow through the envelope under the influence of gravity.

As shown in FIG. 2, the rigid member consists generally of a flexible case 18 into which is inserted a rigid support member as shown at 20. The direction of insertion is indicated by arrows 22 and 24. The case 18 may be formed of plastic which may be polypropelene or some other such plastic of the order of magnitude of thickness of about 0.005 inches. The plastic is preferably the same as that from which the envelope 12 is fabricated in order that the two may be readily welded together as discussed hereinbelow. The member 20 is preferably a rigid member fabricated of polyisocyanurate board wood, fiberboard or the like. The member is preferably an insulating member which is rigid and capable of imparting rigidly maintained form to the case 18. This form is preferably planar and it will be noted that, for this purpose, the member 20 is a rectangular member of generally planar configuration.

Supported over the envelope 12 and the rigid member 14 is the glazing 30. This glazing is preferably dome-shaped so as to define over the envelope 12 and with the same a chamber 32. For this purpose, the glazing 30 is provided with a shoulder 34 and a peripheral edge 36 provided with notches 38 whereby to accommodate the clasping ends 40 of straps which operate to hold the glazing 30 onto the rigid member 14.

One of the most significant features of the invention is the configuration of the envelope 12 as a sequence of adjacent ruffles. These ruffles are indicated, for example, at 42, 44 and 46. There are a much larger number of ruffles as will be readily seen from an inspection of the drawing.

The envelope itself is provided with a plurality of parallel seams such as indicated at 48. These seams divide the envelope into a plurality of longitudinally disposed channels such as indicated at 50. To form these channels, the envelope is formed of facing films which are welded together at the aforesaid seams so that each channel constitutes, in effect, a partially flattened tubular passage.

As has been mentioned hereinabove, the case 18 of rigid member 14 is made of plastic so as to enable a welding or other convenient connection to the envelope 12. This connection takes place, for example, at a plurality of spaced positions such as indicated by way of example at 60 and 62. The positions are spaced along the longitudinal extent of the envelope 12 and the rigid member 14. All of these positions are preferably equally spaced. An example spacing is indicated by way of example at D. This distance is less than the length of the corresponding portion 64 of the periphery of the envelope and, as a consequence, this portion 64 is flexibly disposed as well as capable of arcuate conformation such as to be able to form a ruffle, for example, of the type illustrated. Actually, the entire length of the envelope, or substantially the entire length, is formed as a plurality of ruffles, it having been discovered that such ruffles enable the envelope to partake of a peristaltic type flutter-like action which enables the flushing away of bubbles which may be incorporated in the liquid or fluid passing through the various channels under the influence of gravity.

Figure 3:
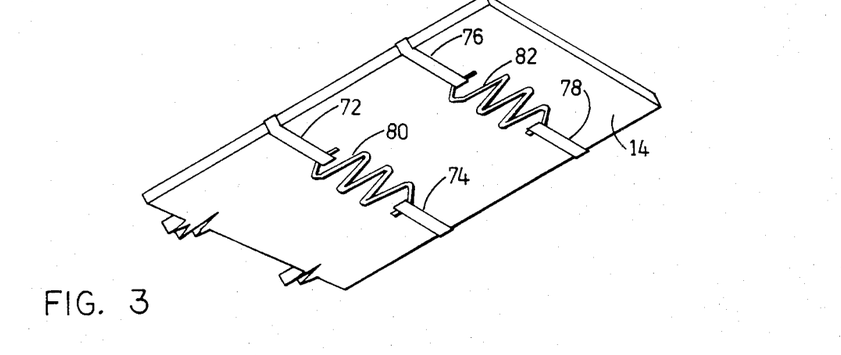
FIG. 3 is a perspective view from below of part of the structure of FIG. 1 showing some of the details hidden if FIGS. 1 and 2.

It will be noted that the envelope 12 is only peripherally connected to the rigid member 14 at the various position 60, 62, etc. This formation of ruffles at the peripheral edges of the envelope enables the peristaltic type action noted hereinabove to be effected. The peristaltic type action is, however, enabled to be effected through the entire transverse section of the envelope by the application of tension to the edges of the envelope, preferably at selected of the above-mentioned positions thereof. Thus, for example, there is provided a strap 70 which is representative of a number of such straps which are wrapped around the rigid member 14 to be connected, more particularly, as illustrated in FIG. 3. In FIG. 3 are shown the distal end portions 72, 74, 76 and 78 of the various straps which are connected at different positions along the absorber envelope. These distal end portions are connected together by spring members 80 and 82 which apply tension to the associated straps and thereby to the peripheries of the associated absorber envelope. This in turn enables the envelope to be held in tension transversely of the longitudinal extent thereof, thereby to enable the peristaltic type action to be effected throughout the entire breadth of the envelope.

One problem encountered in the apparatus of the invention is the attaining of excess temperatures within the chamber 32. When sufficiently excessive temperatures are attained, damage may be done to the envelope 12 which may take a permanent set and thereby not function as effectively as might be otherwise desired in accordance with the provisions of the invention. To enable preventing the attaining of too high a temperature in the chamber 32, there are provided a number of vents such as indicated at 80, these vents being provided at opposite ends of the glazing 30. These vents may vary in size and number, but are preferably located at the upper and lower ends of the glazing 30 when the solar system of the invention is positioned for operation.

Figure 4:
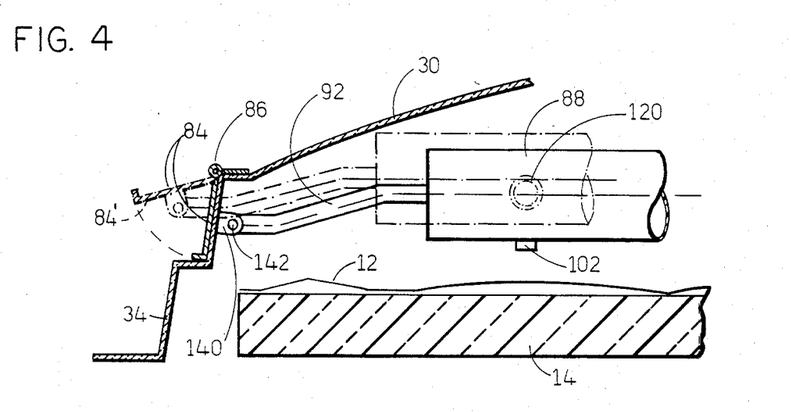
FIG. 4 is fragmentary view in section taken along line IV—IV of FIG. 1.

To selectively close these vents, there is provided at the opposite ends of the glazing, two pivotally mounted flaps 82 and 84. These flaps are mounted by means of spring loaded hinges such as indicated at 86 in FIG. 4, whereby the flaps are maintained in a position such that the associated vents are normally open. In accordance with one embodiment of the invention, there is provided a hollow tube 88. This tube 88 is connected at one end by means of a link 90 (FIG. 1) to flap 82 and at the other end by means of a link 92 to flap 84. The tube 88 is connected in series with the input section of the solar panel of the invention as will be described in greater detail hereinbelow. However, the tube 88 will presently be understood as conveying to the input section the fluid which is intended to flow through the envelope 12. This fluid enters the tube 88 via a flexible hose as indicated at 100 in FIG. 1. The tube 88 is moreover provided with a vacuum breaker valve 102 (see FIG. 4) which is constituted by a ball valve which enables air to be leaked into the tube 88 when the operation thereof is terminated and water is being drained therefrom, via the flexible hose 100.

Figure 5:
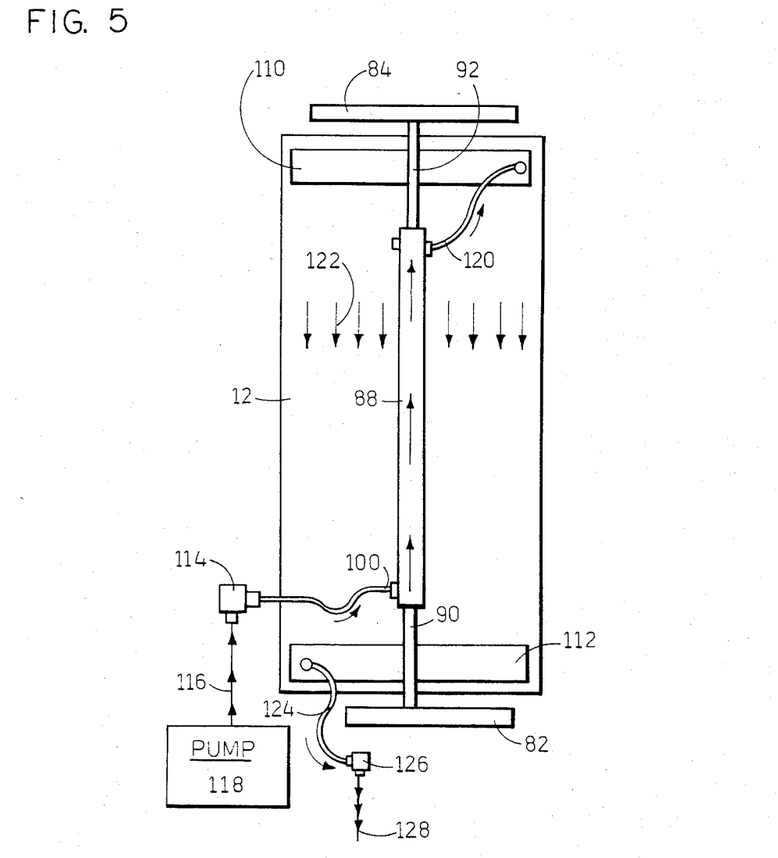
FIG. 5 is a diagrammatic view illustrating the control of the vent closing devices in the apparatus of FIGS. 1-4.

FIG. 5 illustrates the operation of the venting device of the invention in diagrammatic detail. Therein appears the envelope 12, the upper manifold 110 which constitutes the input section and the lower manifold 112 which constitutes the lower manifold or output section. The hose 100 is indicated as being coupled to a fixture 114 which is mounted in the glazing 30 for connection to a line 116 which is connected in turn to a pump 118. Fluid pumped by pump 118 passes via line 116 and fixture 114 through hose 100 into tube 88. The fluid then passes via line 120 into the manifold 110, the details of which will be explained hereinbelow, and from the mainfold 110 through the envelope 12 under the influence of gravity as shown by arrows 122 to be discharged via lower manifold 112, line 124 and fitting 126 and line 128 into an open reservoir system so that the entire system of the invention is open to the ambient atmosphere and pressure.

As has been indicated hereinabove, the tube 88 is connected via links 90 and 92 to pivotally mounted flaps 82 and 84. The operation of the system is as follows. At a non-operative period of the solar system of the invention, the tube 88 is void of fluid and is at its lightest weight. The spring loaded hinges 86 of the system operate to open the flaps with the flap 82 opening inwardly of the chamber 32 and the flap 84 opening outwardly of the same. When the system commences operation, fluid is driven via pump 118 via the route discussed hereinabove into and through the tube 88. When the tube 88 is filed to a predetermined degree, the force of the spring loaded hinges 88 is overcome and, due to gravity, the tube 88, because of its weight, operates to overcome the force of spring loaded hinges 86. The flaps 82 and 84 are thus closed, thereby closing the vents 80. As a consequence, the chamber 32 is effectively sealed off, and a optimum usage of the solar energy passing through glazing 30 is effected. When the system is static, the presence of the vacuum breaker valve 102 permits the tube 82 to be drained under the influence of gravity and the weight of the tube 88 decreases, thereby permitting the spring loaded hinges 86 to operate to open the flaps 82 and 84. This opening of the flaps permits air to enter into the chamber 32 as a consequence of which excessive temperatures in the chamber 32 are avoided. This in turn avoids damage to the envelope 12.

Referring again to FIG. 4 it is seen that the details of the construction include a pivoting of link 32 to a tab 140, which is mounted on the flap 84, by means of a pivot pin 142. The displaced position of the flap 84 is indicated in phantom lines at 84'. The glazing is indicated once again at 30 with its shoulder 34 accommodating the presence of rigid member 14 with envelope 12 being mounted thereupon.

Figure 6:
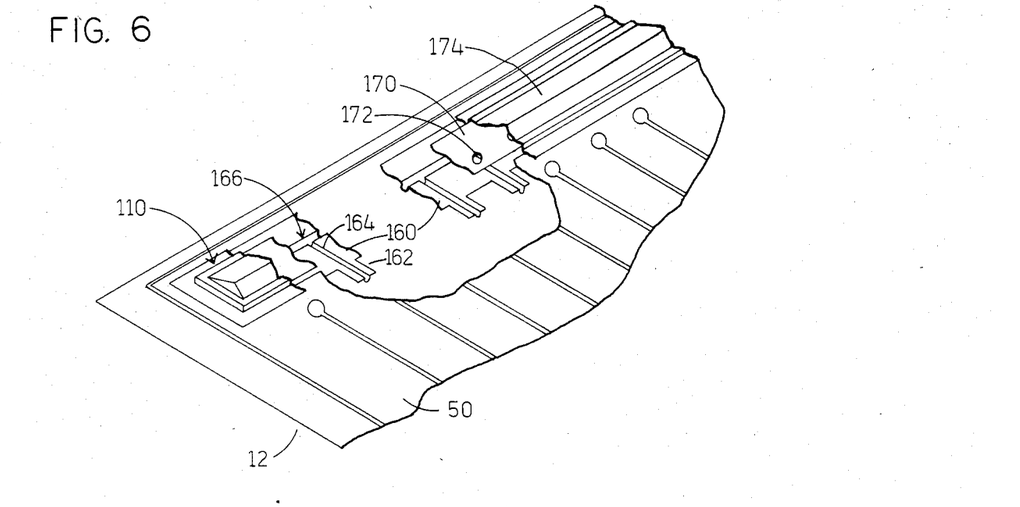
FIG. 6 is a fragmentary perspective view of a portion of the apparatus of FIGS. 1 and 2 illustrating more particularly the input manifold incorporated therein.

FIG. 6 illustrates the details of the upper manifold 110. This figure also illustrates envelope 12 with channels 50 therein. The manifold 110 includes a lower sheet 160 formed with fingers 162 extending into respective of the channels. In sheet 160, as well in fingers 162, are formed ducts 164 which open into the various channels. A transverse duct 166 is also provided which connects the various ducts 164. An intermediate sheet or plate 170 is provided which divides the manifold into upper and lower chambers. This sheet is provided with a number of openings 172, which correspond in position to be superposed above the ducts 164. Above the sheet 170 is provided a tent like sheet 174. This sheet is welded to the sheets 160 and 170 and is moreover welded to an opening provided in the upper film of the envelope 12. The presence of the fingers 162 enables the maintaining of the mouths of the channels 50 open so that each channel is provided with a substantially equally pressure and volume of fluid. The positioning of the openings 172 over the channels or ducts 164, enables an even distribution of the fluid to the respective fingers. The presence of the tent like sheet 174 to form a chamber above the sheet 170 enables fluid to be transferred equally without a varying resistance over the entire breath of the envelope 12.

Figure 7:
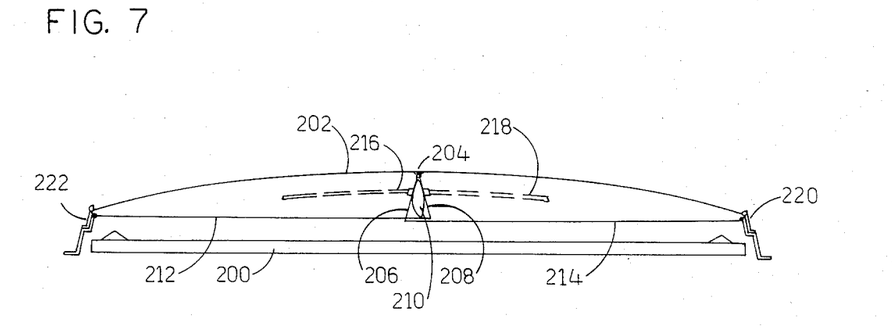
FIG. 7 is a side diagrammatical view illustrating a further embodiment of the invention, whereby the venting of the solar panel construction is modified.
Figure 8:
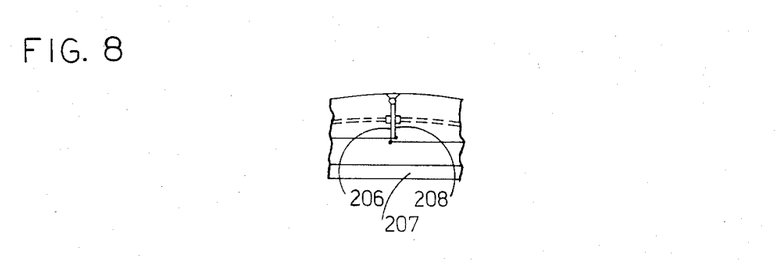
FIG. 8 is a fragmentary view illustrating the control portion of the apparatus of FIG. 1 in a different state.

FIGS. 7 and 8 illustrate a further embodiment of the venting arrangement of the invention. Therein is shown a rigid member 200 upon which is superposed an absorber envelope of the above indicated type. Above the envelope is superposed a glazing 202 on which is mounted a pivot 204 from which depend two flaps 206 and 208 which are thereby pivotally disposed.

Between flaps 206 and 208 is located a bladder 210 extending, at least partially, across the breath of the solar panel of the invention. To the flaps 206 and 208 are connected linkages or cables 212 and 214.

Fluid is fed to and taken away from the bladder 210 via hoses 216 and 218. Fluid is admitted into the bladder 210 via hose 216 at a faster rate than it passes via hose 218 to the lower of the two manifolds. This enables the bladder 210 to be expanded when the system is in operating condition. Expansion of the bladder 10 moves the flaps 206 and 208 from the positions illustrated in FIG. 8 to the positions illustrated in FIG. 7.

The displacement of the flaps 206 and 208, due to the response of bladder 210 to the volume of fluid therein, permits the displacement of cables 212 and 214. Inasmuch as these cables are attached to flaps 220 and 222, a displacement of the same ensues thereby enabling the opening and closing of vents in the manner described hereinabove. It will thus be understood that the invention provides for different embodiments of the invention which respond to the weight of fluid being put into the system and to the volume of such fluid respectively.

Figure 9:
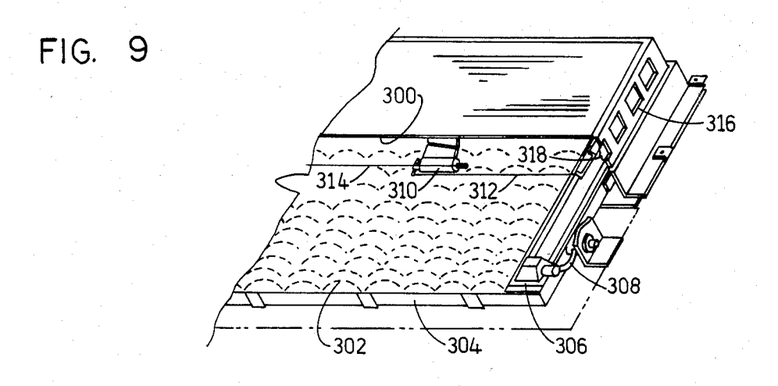
FIG. 9 is a fragmentary view of an absorber plate and envelope corresponding to a portion of FIG. 1, but showing a further embodiment of the invention incorporating a modified ventilating control.

In FIG. 9 is illustrated a glazing 300 forming a chamber above absorber envelope 302 mounted on a support 304 in a manner which has been indicated in greater detail hereinabove. A supply of fluid to the envelope takes place through an input manifold as has been described in the aforegoing text. The output of fluid from the envelope takes place through a manifold 306 and a tube 308.

In this embodiment of the invention, an actuator 310 is employed to operate cables 312 and 314 which are respectively coupled to the flaps at the upper and lower ends of the solar panel. The controlled vents are indicated generally at 316 and the flap is indicated generally at 318.

Figure 10:
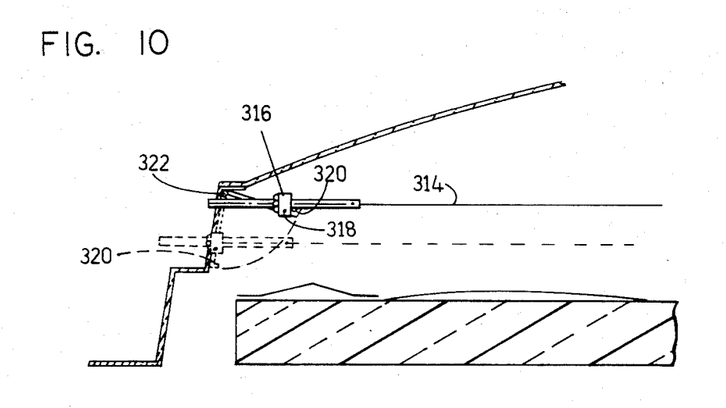
FIG. 10 is a view corresponding to FIG. 4, further illustrating this additional embodiment of the invention.

In FIG. 10 appears the upper flap 320 controlling the associated vent. The flap is shown in both opened and closed attitudes. By way of example, the cable 314 is connected to a fixture 316 which is connected via a pivot pin 318 to the flap which is to be controlled. The utilization of this fixture enables the coupling between the cable 314 and the flap 320 to accommodate the change of attitude of the flap relative to the hinge 322 provided for the same.

Figure 11:
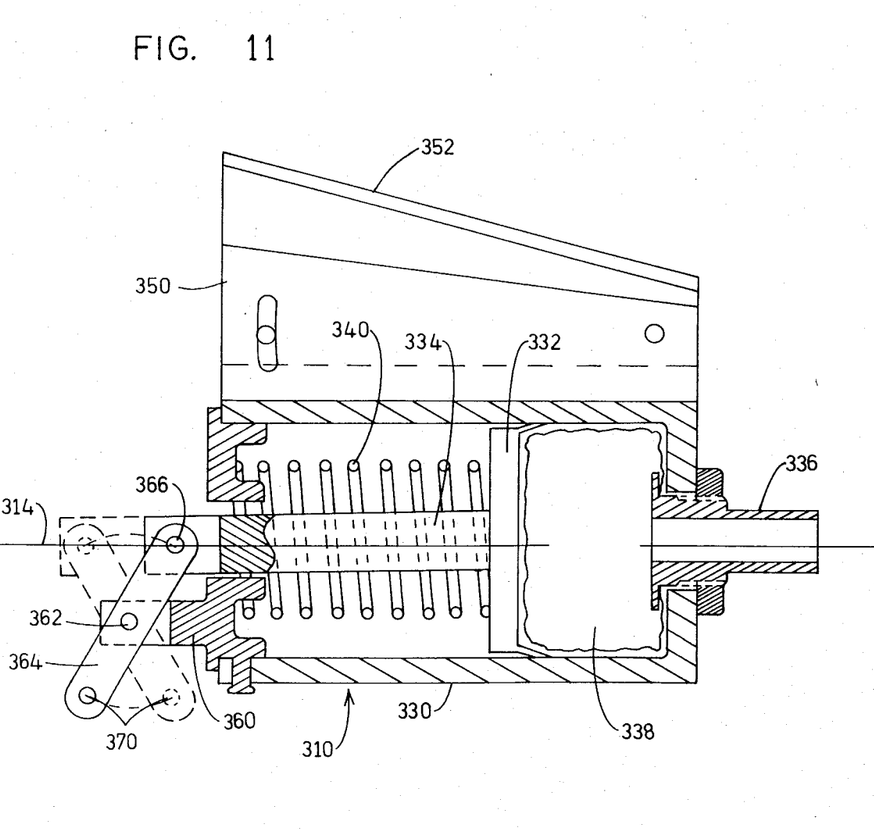
FIG. 11 is a sectional view through the actuator employed in the embodiment illustrated in FIG. 9.
Figure 12:
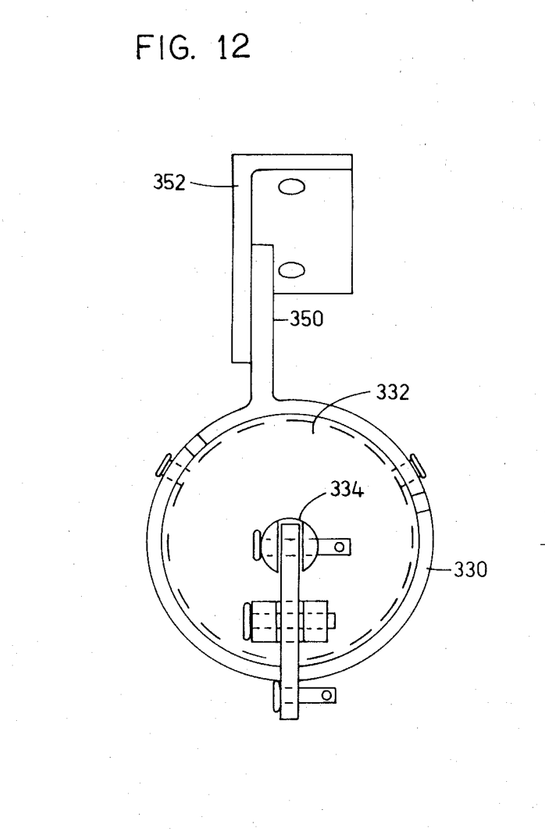
FIG. 12 is an orthogonal section through the structure illustrated in FIG. 11.

The details of the actuator 310 are seen in FIGS. 11 and 12, wherein appear the cylinder 330 and the piston 332 connected to the piston rod 334. It will be seen that the cylinder 330 is provided with a fixture 336 which provides for the admission of fluid or water into the chamber 338. The piston rod 334 is encircled by the spring 340 which loads the piston 332 and operates against the force of the water in chamber 338 and the hydraulic or fluid head operatively effecting the same. The cylinder 330 is connected via a mounting flange 350, which is connected to a bracket 352 mounted on the glazing superposed above the absorber envelope. It will be obvious that other forms of mounting are also possible within the scope of the invention.

The cylinder is provided with a mounting 360 which, by means of a pin 362, supports a lever 364. This lever is pivotally connected by a pin 366 to the piston 334. Cable 314 is connected to the piston rod 334, whereas, cable 312 is connected to the outer extremity 370 of the lever 364. This means that the cables will be permitted displacement in opposite direction upon operation of the piston 332.

Figure 13:
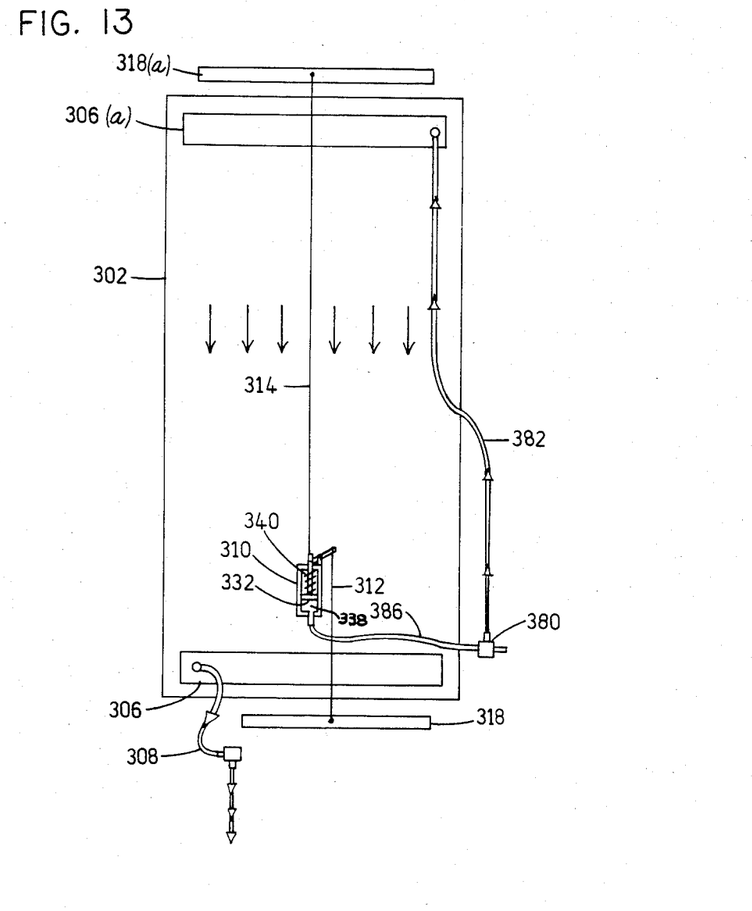
FIG. 13 is a diagrammatic view corresponding to FIG. 5 illustrating this additional embodiment of the invention.

As illustrated in FIG. 13, a T connection 380 supplies water or other equivalent fluid via a tube 382 to upper manifold 306(a). This water passes down through the absorber envelope 302 and via output manifold 306 into output line or tube 308. The T connection 380, moreover, feeds water through tube 386 to the actuator 310 and, more particularly, to the chamber 338 thereof. As the supply of water creates a suitable hydraulitic or fluid head due to the relative vertical spacing of the actuator 310, with respect to the input manifold 306(a), the force of the spring 340 is overcome, and the piston 332 is displaced. This is effective through the cables 314 and 312 to permit the spring loaded flaps 318(a) and 318 to be operated. These flaps are spring loaded to be closed and the displacement of piston 332 operates through the cables 312 and 314 to cause the flaps to be opened. These flaps are illustrated as opening inwardly, but any suitable arrangement of these flaps is permissible. Thus, for example, the pivotal flaps, which are illustrated, may be replaced by spring loaded flaps which close in the manner of sliding shutters and the term flap is employed to be representative only and without limitation of obturating devices which may be utilized to close and open vents respectively.

There will now be obvious to those skilled in the art, many modifications and variations of the systems set forth hereinabove. These modifications and variations will not depart from the scope of the invention if defined by the following claims.

What is claimed is:

1. A solar system comprising input means for the supply of a fluid adapted for the absorbing of solar energy, output means for receiving and recirculating said fluid for purposes of heat exchange, solar-energy absorber means coupling said input means to said output means for the conveying of said fluid between the same, said absorber means being a thin-film flexible envelope, and support means to support said envelope at spaced positions between which corresponding lengths of the envelope are longer than the distances between the positions so as to enable the envelope to have a peristaltic-type flutter action in the direction of flow of said fluid from the input means to the output means whereby to aid in causing bubbles formed in said fluid to be flushed out of said absorber means thereby to improve the thermal efficiency of the same.

2. A solar system as claimed in claim 1, wherein said support means includes a relatively rigid member having a longitudinal extent corresponding generally to the direction of the flow of said fluid through said envelope, said positions being spaced along the longitudinal extent of said rigid member, said envelope being fixed to the rigid member at said positions.

3. A solar system as claimed in claim 2, wherein the fixing of the envelope to the rigid member forms ruffles in the envelope.

4. A solar system as claimed in claim 2, wherein the envelope is peripherally fixed to the rigid member.

5. A solar system as claimed in claim 2, wherein the rigid member includes a flexible case and a rigid interior member within the case to support the same.

6. A solar system as claimed in claim 5, wherein the envelope and case are of plastic and are welded together at said positions.

7. A solar system as claimed in claim 1, wherein said positions are substantially equally spaced.

8. A solar system as claimed in claim 1 comprising means coupling said output means to said input means in an endless circuit which is open to ambient atmosphere.

9. A solar system as claimed in claim 8, wherein said absorber means is arranged at an incline so that said fluid passes through the envelope from the input means to the output means under the influence of gravity.

10. A solar system as claimed in claim 5 comprising means for applying transverse tension to said envelope at at least some of said positions.

11. A solar system as claimed in claim 3, wherein said envelope includes seams dividing the envelope into parallel channels extending between said input and output means with an opening which opens into said channels.

12. A solar system as claimed in claim 3, wherein said envelope is of a plastic having a thickness in the order of magnitude of about 0.005 inches.

13. A solar system as claimed in claim 3 comprising a glazing means supported over said envelope and forming a chamber with said envelope.

14. A solar system comprising a thin film absorber envelope and support means to support the envelope in inclined posture for the gravity flow of fluid therethrough and to fix the envelope in ruffled condition at spaced positions the distances between which are less than the lengths of the corresponding portions of the envelope.

15. A solar system as claimed in claim 14, wherein the positions are substantially equally spaced.

16. A solar system as claimed in claim 14, wherein the support means include a plastic case and a stiffening member within said case, said envelope being of plastic welded at said positions to said plastic case.

17. A solar system comprising input means for the supply of a fluid adapted for the absorbing of solar energy, output means for receiving and recirculating said fluid for purposes of heat exchange, and solar-energy absorber means coupling said input means to said output means for the conveying of said fluid between the same, said absorber means being a thin-film flexible envelope, and support means to support said envelope at spaced positions between which corresponding lengths of the envelope are longer than the distances between the positions so as to enable the envelope to have a peristaltic-type flutter action in the direction of flow of said fluid from the input means to the output means whereby to aid in causing bubbles formed in said fluid to be flushed out of said absorber means thereby to improve the thermal efficiency of the same; said input means including a manifold to distribute the fluid into said envelope.

18. A solar system as claimed in claim 17, said envelope including seams to divide the envelope into a plurality of channels, said manifold including fingers entending respectively into the channels.

19. A solar system as claimed in claim 18, wherein said manifold includes three sheets forming two chambers separated by one of said sheets which is provided with openings, a second of said sheets including said fingers, said fingers being provided with passages opening into the channels.

20. A solar system as claimed in claim 19, wherein said second sheet is provided with a further passage coupling the first said passages.

21. A solar system as claimed in claim 20, wherein the openings in the second sheet are superposed over the passages opening into the channels.

22. A solar system as claimed in claim 21 wherein a third of said sheets is a tent-like sheet and is welded into an opening provided in said envelope.

* * * * *